Feb. 7, 1950     E. C. HARTWIG     2,496,719
CONTROL SYSTEM
Filed Aug. 22, 1946
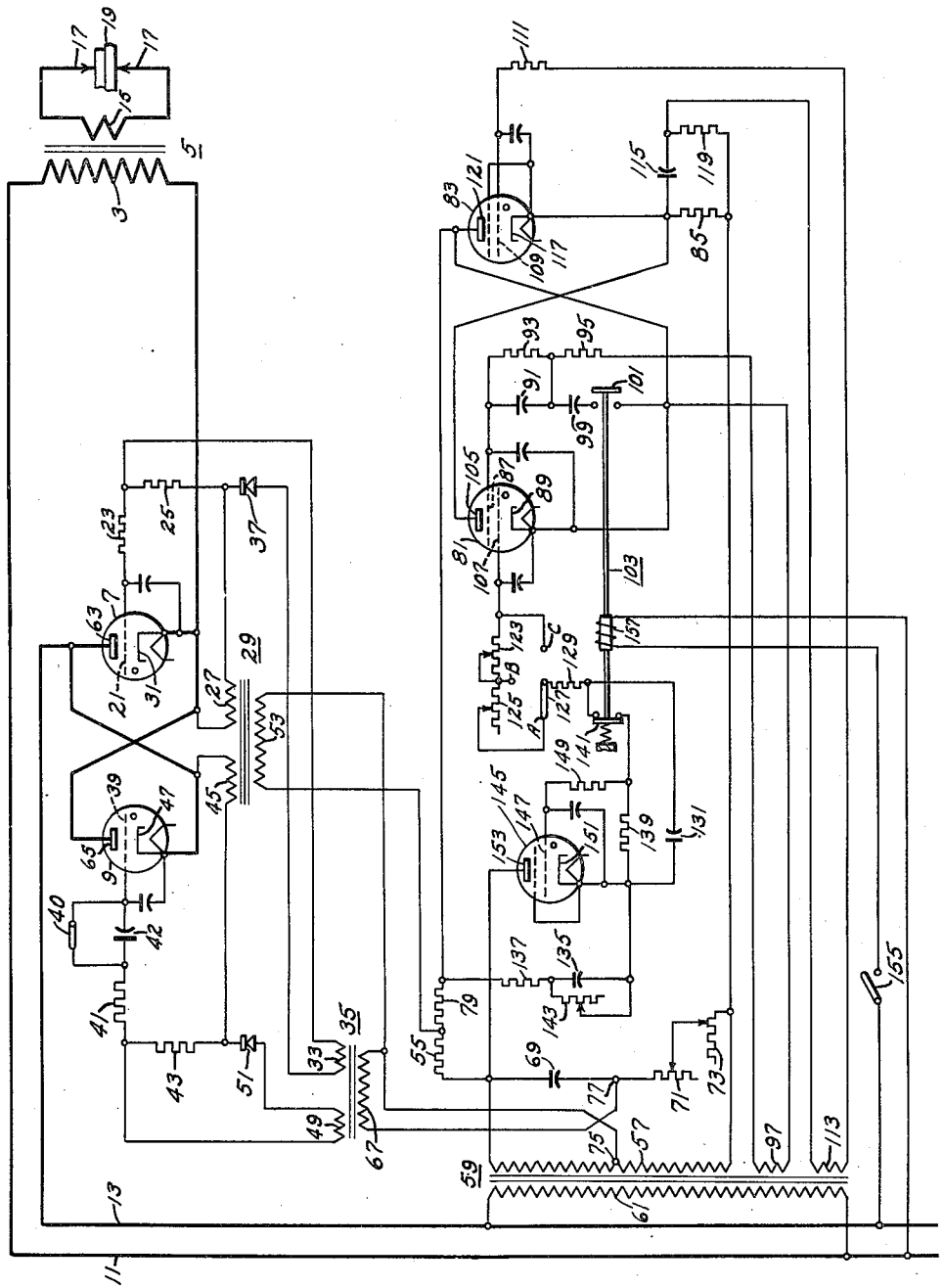
WITNESSES:
Leon M. Garman
John P. Shipman
INVENTOR
Edward C. Hartwig.
BY
Hyman Diamond.
ATTORNEY Patented Feb. 7, 1950

2,496,719

UNITED STATES PATENT OFFICE 2,496,719

CONTROL SYSTEM

Edward C. Hartwig, Tonawanda, N. Y., assignor to Westinghouse Electric Corporation, East Pittsburgh, Pa., a corporation of Pennsylvania Application August 22, 1946, Serial No. 692,400

12 Claims. (Cl. 315—246)

This invention relates to an electronic control system for use in supplying current through a load from an alternating voltage source and it has particular relation to such a system in which the supply of current is limited to an accurately timed interval.

In resistance welding control systems, current is customarily supplied to the welding transformer load from an alternating voltage source through a pair of electric valves of the arc-like type. The valves are connected inversely and rendered conductive alternately in opposite half periods of the alternating voltage. The effective voltage supplied to the welding transformer, and therefore the heat developed at the weld, is controlled by adjustment of the instant in a half period at which the valves are rendered conductive.

In such systems it is often necessary to initiate the supply of current to the welding transformer in synchronism with the alternating voltage and to limit the supply of current to an accurately timed interval to obtain the desired weld. Prior apparatus is available for controlling the supply of current in this manner, but such apparatus is rather complicated, requiring a number of valves as well as associated control circuits, which greatly increases the manufacturing cost. Moreover, while many operations of the welding system require a time interval of the order of 15 to 30 periods of the alternating voltage, some operations require a time interval as short as one half period. For these shorter intervals it is often necessary to provide an entirely different control system from that used for the longer intervals.

It is accordingly an object of my invention to provide a new and improved control system for use in supplying current to a load from an alternating voltage source.

A further object of my invention is to provide such a control system in which the supply of current is accurately timed.

Still another object of my invention is to provide such a system in which the supply of current is initiated synchronously with the alternating voltage and is limited to a preselected time interval.

A still further object of my invention is to provide a new and improved control system in which the supply of current to the load may be accurately timed over a wide range of preselectable time intervals.

In accordance with my invention a control system is provided in which a first circuit tends to render control valve means in a load supply circuit conductive a preselected instant in a half period of an alternating voltage supply. At the same time a second circuit is effective to prevent the operation of the valve means. A novel timing circuit is then provided which is operable throughout a preselected time interval to render the second circuit ineffective and thereby permit the valves to become conductive during that interval under the influence of the first circuit.

The features of my invention which I consider novel are set forth with greater particularity in the accompanying claims. The invention itself, however, together with the advantages and further objects thereof, may be best understood from the following description of a specific embodiment thereof when read in connection with the accompanying drawing in which the single figure is a schematic circuit diagram of a preferred embodiment of my invention as applied to a resistance welding control.

As shown in the drawing, the primary winding 3 of a welding transformer 5 is connected in series with a pair of inversely connected electric valves 7 and 9 across a pair of alternating supply lines 11 and 13. The valves 7 and 9 are preferably of the arc-like type, such as thyratrons, and are hereinafter referred to as the main valves. The secondary winding 15 of the welding transformer 5 is connected in circuit with welding electrodes 17 and the material 19 engaged therebetween.

The control circuit of the first main valve 7 may be traced from the control electrode 21 thereof through a limiting resistor 23, another resistor 25 and a secondary winding 27 of a first auxiliary transformer 29 to the cathode 31 of the valve. A secondary winding 33 of a second auxiliary transformer 35 is connected in circuit with a rectifier 37 across the resistor 25.

The control circuit of the second main valve 9 may be traced from the control electrode 39 thereof through a normally closed switch 40 short-circuiting a capacitor 42, a limiting resistor 41, another resistor 43 and another secondary winding 45 of the first auxiliary transformer 29 to the cathode 47. Another secondary winding 49 of the second auxiliary transformer 35 is connected in circuit with another rectifier 51 across the resistor 43.

The primary winding 53 of the first auxiliary transformer 29 is connected in circuit with a resistor 55 across a portion of a secondary winding 57 of an auxiliary supply transformer 59, the primary winding 61 of which is energized from the supply lines 11 and 13. The arrangement is such that the voltage impressed between the control electrode and cathode of each of the main valves 7 and 9 through the first auxiliary transformer 29 is 180° out of phase with the voltage appearing between the anode and cathode 63 and 31, 65 and 47, respectively of the main valves 7 and 9. The voltage thus supplied in the control circuits of the main valves 7 and 9 by the first auxiliary transformer 29 tends to maintain the control electrode to cathode voltage of each main valve more negative than the critical voltage of the valve, with respect to which the control electrode to cathode voltage must be more positive to render the valve conductive in a positive half-period of the alternating voltage. By a positive half-period is meant one in which the anode of the valve under consideration is positive relative to the cathode. In other words, the voltage supplied through the first auxiliary transformer tends to maintain the main valve non-conductive.

The primary winding 67 of the second auxiliary transformer 35 is energized from a phase shifting circuit which includes a capacitor 69 and a pair of adjustable resistance elements 71 and 73 connected in the order named across the secondary winding 57 of the auxiliary supply transformer 59 with the primary winding 67 of the second auxiliary transformer 35 being connected from an intermediate tap 75 on the secondary winding 57 to a point 77 intermediate the capacitor 69 and the adjustable resistance element 71. The voltage across the primary winding 67 of the second auxiliary transformer 35 is shifted in phase with respect to the supply voltage by an amount determined by the adjustment of the variable resistance elements 71 and 73. Because of the action of the rectifiers 37 and 51, the voltage appearing across the resistors 25 and 43 in the control circuits of the main valves 7 and 9, respectively, takes the form of a rectified alternating voltage shifted in phase with respect to the supply voltage and inverted relative to the corresponding control electrode. This voltage tends to render each main valve conductive at a preselected instant in each corresponding positive half-period as determined by the amount of phase shift. In this connection the resistance element 71 may be adjusted in accordance with the power factor of the load while the other resistance element 73 may be adjusted in accordance with the heat desired.

While the voltage supplied to the control circuits of the main valves through the second auxiliary transformer tends to render each main valve conductive at a preselected instant in a positive half-period, the voltage supplied through the first auxiliary valve is sufficient normally to prevent the main valves from becoming conductive.

The resistor 55 in circuit with the primary winding 53 of the first auxiliary transformer 29 is also connected in circuit across the entire secondary winding 57 of the auxiliary supply transformer 59 through a second resistor 79, a pair of inversely connected auxiliary valves 81 and 83 and a third resistor 85. The auxiliary valves 81 and 83 are preferably of the arc-like type, such as thyratrons, and are effective to control a supply of current through the first and second resistors 55 and 79.

The first auxiliary valve 81 is preferably a tetrode with a shield grid 87 thereof connected to the cathode 89 through a parallel connected capacitor 91 and resistor 93 in series with a resistor 95 and another secondary winding 97 of the auxiliary supply transformer 59. Another capacitor 99 is connected across the resistor 95 and secondary winding 97 through a normally open contact 101 of a relay 103.

The arrangement is such that the voltage appearing across the secondary winding 97 is 180° out of phase with the voltage from the anode 105 to the cathode 89 of the first auxiliary valve 81. In the half periods of the supply voltage in which the anode 105 is negative, the voltage across the secondary winding 97 causes the shield grid 87 to be positive with respect to the cathode 89. Consequently, current flows from the shield grid 87 to the cathode 89, resulting in a charging of the capacitor 91. Thus at the beginning of a half period in which the anode 105 is positive, the voltage on capacitor 91 causes the shield grid 87 to be negative with respect to the cathode 89 to prevent the valve 81 from becoming conductive even though the voltage from the control grid 107 to the cathode 89 is slightly more positive than the critical value necessary to cause the valve to become conductive. The critical value for the preferred valve is of the order of minus six volts which is a typical value for a suitable thyratron. As will appear hereinafter, the control grid to cathode voltage is substantially zero originally and so is more positive than the critical value but the shield grid to cathode voltage is effective to maintain the valve 81 nonconductive.

The control circuit of the second auxiliary valve 83 may be traced from the control grid 109 thereof through a grid resistor 111, another secondary winding 113 of the auxiliary supply transformer 59 and a capacitor 115 to the cathode 117. The capacitor 115 is also connected across the third resistor 85 in circuit with the main auxiliary valves, through still another resistor 119. Consequently, the capacitor 115 is charged by current through the first auxiliary valve 81 when that valve is conductive, and the polarity of the charge is such as to tend to render the control grid 109 of the second auxiliary valve 83 positive with respect to the cathode 117. The voltage appearing across the secondary winding 113 in the control circuit is approximately 180° out of phase with the voltage appearing from the anode 121 to the cathode 117 of the second auxiliary valve. This secondary winding voltage tends to maintain the secondary auxiliary valve 83 nonconductive. However, the capacitor 115 is charged sufficiently each time the first auxiliary valve 81 is conductive to overcome the effects of the voltage of the secondary winding 113. As a result the second auxiliary valve 83 is rendered conductive each half period of the supply voltage immediately following a half period in which the first auxiliary valve 81 is conductive. The capacitor 115 is, of course, discharged in the half-period while the second valve 83 is conductive and charged with an opposite polarity to prevent the second valve 83 from becoming conductive until after the first valve 81 is again conductive.

The control circuit of the first auxiliary valve 81 may be traced from the control grid 107 thereof through a first and a second potentiometer 123 and 125, a switch 127, a resistor 129, a timing capacitor 131, a biasing capacitor 135 and another resistor 137 to the cathode 89. A discharge circuit including a resistor 139 is connected across the timing capacitor 131 through a normally closed contact 141 of the relay 103. A discharge circuit including an adjustable resistor 143 is also connected across the biasing capacitor 135.

The switch 127 may be set to contact any one of three points, A, B or C. In position A, as shown, the control circuit of the first auxiliary valve 81 includes both the first and second potentiometers 123 and 125. In position B, the second potentiometer 125 is short circuited. In position C both potentiometers 123 and 125 are short-circuited. These three positions may correspond to time intervals of from 15 to 30 periods of the supply voltage, 1 to 15 periods, and one half-period respectively.

A rectifier 145, preferably in the form of another auxiliary valve of the arc-like type, such as a thyratron, is connected to conduct current from the terminal of the first resistor 55 which is opposite that terminal to which the second resistor 79 is connected, to a point on the control circuit of the first auxiliary valve 81 between the timing capacitor 131 and biasing capacitor 135. The control circuit for the rectifier 145 may be traced from a control grid 147 through a grid resistor 149 and the resistor 139 in the discharge circuit of the timing capacitor 131, to the cathode 151. Consequently, the rectifier 145 is in condition to conduct current in each half-period in which the second auxiliary valve 83 is conductive to provide a positive voltage between the anode 153 of the rectifier and the cathode 151 by means of the voltage developed across the first resistor 55 and the second resistor 79 by the flow of current therethrough.

In considering the operation of the system as illustrated, it is first noted that the main valves 7 and 9 are originally maintained nonconductive by the voltage supplied through the first auxiliary transformer 29. The first and second auxiliary valves 81 and 83 are maintained nonconductive by the voltage supplied through the secondary windings 97 and 113 of the supply transformer 59. The timing capacitor 131 and the biasing capacitor 135 are both in a discharged state.

To initiate operation of the apparatus, the switch 127 is set in the desired position. For purposes of discussion, let it be assumed that it is set in the position A as illustrated. Thereafter an initiating switch 155 may be closed to complete a circuit from the supply lines 11 and 13 through the energizing coil 157 of the relay 103. The relay 103 is then energized and one of its contacts 141 opens the discharge circuit across the timing capacitor 131, while the other contact 101 completes the connection of the capacitor 99 across the resistor 95 and secondary winding 97 in the shield grid circuit of the first auxiliary valve 81.

When the capacitor 99 is connected in circuit across the resistor 95 and the secondary winding 97, the voltage supplied between the shield grid 87 and cathode 89 of the first auxiliary valve 81 from the secondary winding 97 is shifted in phase so that the first auxiliary valve 81 may become conductive at the beginning of a half-period in which its anode 105 is positive, provided the control grid to cathode voltage is more positive than the critical value for the valve. Since the timing capacitor 131 and the biasing capacitor 135 are in a discharged state, the control grid to cathode voltage of the first auxiliary valve 81 is approximately zero and is, therefore, more positive than the negative critical value. As a result, the first auxiliary valve 81 is rendered conductive at the beginning of the next half-period in which its anode 105 is positive following operation of the initiating switch 155.

While the first auxiliary valve 81 is conductive, current flows through the first resistor 55 to develop a voltage thereacross which opposes the voltage applied across the primary winding 53 of the first auxiliary transformer 29 from the secondary winding 57 of the auxiliary supply transformer 59. This voltage across the resistor 55 is sufficient to counteract the voltage applied from the auxiliary supply transformer so that the voltage supplied in the control circuit of the first main valve 7 through the first auxiliary transformer 29 becomes ineffective to prevent the first main valve from becoming conductive. The anode 63 of the first main valve is positive in the same half-period of the supply voltage in which the first auxiliary valve 81 is conductive. Consequently, the first main valve 7 is rendered conductive in the half-period of the supply voltage at an instant determined by the amount of phase shifting in the voltage supplied through the second auxiliary transformer 35 to supply current through the welding transformer.

While the first auxiliary valve 81 is conductive, the capacitor 115 in the control circuit of the second auxiliary valve 83 is charged. Consequently, the second auxiliary valve 83 becomes conductive in the next half-period. While the second auxiliary valve 83 is conductive, a voltage is also developed across the first resistor 55 which is effective to counteract the voltage supplied across the primary winding 53 of the first auxiliary transformer 29 from the secondary winding 57 of the auxiliary supply transformer 59. It follows that the second main valve 9 is rendered conductive at a preselected instant in the half-period in which the second auxiliary valve 83 is conductive. At the same time, the combined voltage across the first and second resistors 55 and 79 is effective to supply current through the rectifier 145, the biasing capacitor 135 and the resistor 137, whereby the biasing capacitor 135 is charged. Current also flows through the rectifier 145, timing capacitor 131, the potentiometers 123 and 125, the control grid 107 and cathode 89 of the first auxiliary valve 81. Thus the timing capacitor 131 is charged at a rate determined by the setting of the potentiometers 123 and 125.

It is then to be noted that while the charge on the timing capacitor 131 tends to prevent the first auxiliary valve 81 from becoming conductive, the charge on the biasing capacitor 135 is opposed thereto and provides a positive biasing voltage tending to cause the first auxiliary valve 81 to become conductive. The constants of the charging circuits are such that the charge on the biasing capacitor 135 right after the first half-period of charging is far greater than that on the timing capacitor 131, so that the first auxiliary valve 81 is rendered conductive in the next half period after the second auxiliary valve 83 is conductive. The discharge circuit for the biasing capacitor 135 is adapted to discharge the biasing capacitor to substantially the same voltage after each charging interval and by the beginning of the next half-period in which the second auxiliary valve 83 is to become conductive. Consequently, the charge on the biasing capacitor 135 is always at substantially the same magnitude at the beginning of a half-period in which the first auxiliary valve 81 is to become conductive and tends to cause the first auxiliary valve 81 to become conductive, while the charge on the timing capacitor 131 is increased in steps during the half-periods in which the second auxiliary valve 83 is conductive. After a predetermined time interval, as determined by the setting of the potentiometers 123 and 125, the charge on the timing capacitor becomes sufficiently great to overcome the effect of the biasing capacitor and maintains the first auxiliary valve 81 nonconductive. When the first auxiliary valve 81 fails to become conductive, the capacitor 115 in the control circuit of the second auxiliary valve 83 is not charged to the proper polarity so that the second auxiliary valve 83 likewise fails to become conductive in its turn. As the auxiliary valves fail to become conductive, the biasing voltage is again supplied through the first auxiliary transformer 29 to the control circuits of the main valves 7 and 9 to prevent them from becoming conductive.

Reoperation of the system to supply current to the welding transformer for another timed interval may be obtained by opening the starting switch 155 to reset the timing circuit and then reclosing it.

In the event that a timed interval of 1 to 15 periods of the supply voltage is desired, the switch 127 is changed to position B and the first potentiometer 123 is adjusted to correspond to the exact number of periods desired.

In the event that but a single half period of current is to be supplied to the welding transformer, the switch 127 is placed in position C and the switch 40 in the control circuit of the second main valve 9 is opened. Operation of the apparatus then is initiated in the same manner as for longer time intervals. The timing capacitor 131 is then charged to prevent the first auxiliary valve 81 from becoming conductive after one period. Thus the first auxiliary valve 81 is conductive for only one-half period and the second auxiliary valve 83 is conductive for only the next half-period. When the first auxiliary valve 81 becomes conductive, it permits the first main valve 7 to be rendered conductive in that half-period. However, when the second auxiliary valve 83 becomes conductive, the capacitor 42 in the control circuit of the second main valve is already charged by previous grid current to a polarity preventing the second main valve from being rendered conductive. Consequently, only the first main valve becomes conductive and only in one half-period of the supply voltage.

It is then apparent that the system described, while relatively simple and inexpensive to manufacture, is effective to provide accurate timing of the supply of current to the welding transformer in one period steps over a wide range. It is also apparent that the same system may be used in supplying but a single half-period of current to the welding transformer by the operation of a pair of switches.

While I have shown and described a specific embodiment of my invention, I am aware that many modifications thereof may be made without departing from the spirit of the invention. I do not intend, therefore, to limit my invention to the specific arrangement described.

I claim as my invention:

1. A control system for use in supplying current through an impedance member from an alternating voltage source, comprising electric valve means in circuit with said member across said source, a starting device, control connections actuable by said starting device to cause said valve means to be conductive following operation of said starting device and additional connections between said control connections and said member operable by the voltage developed across said member by current therethrough to cause said valve means to be non-conductive a predetermined time interval after operation of said starting device.

2. A control system for use in supplying current through an impedance member from an alternating voltage source, comprising electric valve means in circuit with said member across said source, a starting device, control connections actuable by said device to cause said valve means to be conductive following operation of said starting device, said connections including a capacitor and additional connections between said control connections and said member and including said capacitor connected for charging said capacitor at a preselected rate by the voltage developed across said member upon current flow therethrough, said control connections being effective in response to a predetermined charge on said capacitor to cause said valve means to be non-conductive.

3. A control system for use in supplying current through an impedance member from an alternating voltage source, comprising electric valve means in circuit with said member across said source, a starting device, control connections actuable by said device to cause said valve means to be conductive following operation of said device, said control connections including a capacitor connected in a circuit with a rectifier and a resistor and additional connections connecting said capacitor, resistor and rectifier across said member to charge said capacitor at a predetermined rate as current is supplied through said member, said control connections being effective in responsive to a charge of a predetermined magnitude on said capacitor to cause said valve means to be non-conductive.

4. A control system for use in supplying current through an impedance member from an alternating voltage source, comprising a first electric valve and a second electric valve inversely connected in circuit with said member across said source, a starting device, first control connections actuable by said device to cause said first valve to be conductive in each half-period of said alternating voltage of one polarity following operation of said starting device, second control connections connected to said first valve for causing said second valve to be conductive in each half-period of the opposite polarity immediately following a half-period in which said first valve is conductive, said first control connections including a capacitor connected in a circuit with a rectifier and a resistor, and connections connecting said capacitor resistor and rectifier across said member to charge the capacitor at a predetermined rate as current is supplied through said member, the first control connections being effective in response to a charge of a predetermined magnitude on said capacitor to prevent said first valve from becoming conductive.

5. A control system for use in supplying current through an impedance member from an alternating voltage source, comprising a first electric valve and a second electric valve inversely connected in circuit with said member across said source, the first of said valves having a control electrode and a cathode, a starting device, first control connections actuable by said device to cause said first valve to be conductive in each half-period of said alternating voltage of one polarity following operation of said device, second control connections, connected to said first valve, causing said second valve to be conductive in each half-period of the opposite polarity immediately following a half-period in which said first valve is conductive, said first control connections including a capacitor connected in a circuit with a resistor, first connections between said capacitor and said resistor connecting said capacitor and resistor between said control electrode and said cathode and second connections between said capacitor and resistor and said member whereby said capacitor is charged by the resulting voltage drop across said member at a predetermined rate by a control electrode to cathode current through said first valve each time said second valve is conductive, the first control connections being effective in response to a charge of a predetermined magnitude on said capacitor to prevent said first valve from becoming conductive.

6. A control system for use in supplying current through an impedance member from an alternating voltage source, comprising electric valve means in circuit with said member across said source, a starting device, control connections actuable by said starting device to cause said valve means to be conductive following operation of said starting device and including a first capacitor and a second capacitor, connections between said first capacitor and said member to charge said capacitor at a preselected rate by the voltage developed across said member as current is supplied therethrough, connections between said second capacitor and said member to charge said second capacitor by the voltage developed across said member as current is supplied therethrough with a charge of substantially the same magnitude, and at the same relative instant, as said first capacitor in each period of the alternating voltage during the supply of current through said member, said control connections being effective in response to the difference in the charges on the first and second capacitors to cause said valve means to be conductive following operation of the starting device until the charge on the first capacitor reaches a predetermined magnitude.

7. A control system for use in supplying current through an impedance member from an alternating voltage source, comprising electric valve means in circuit with said member across said source, a starting device, control connections actuable by said device to cause said valve means to be conductive following operation of said starting device and including a first capacitor and a second capacitor, connections between said member and said first capacitor to charge said first capacitor at a preselected rate by the voltage developed across said member as current is supplied therethrough, and connections between said member and said second capacitor to charge said second capacitor also by the voltage developed across said member as current is supplied therethrough, said second capacitor having a resistance circuit connected across it to cause the charge thereon to leak off so that said charge is of substantially the same magnitude at the same relative instant in each period of the alternating voltage during the supply of current through said member, said control connections being effective in response to the difference in the charges on the first and second capacitors to cause said valve means to be conductive following operation of the starting device until the charge on the first capacitor reaches a predetermined magnitude.

8. A control system for use in suplying current through an impedance member from an alternating voltage source, comprising electric valve means in circuit with said member across said source, a starting device, control connections actuable by said device to cause said valve means to be conductive following operation of said starting device and including a first capacitor connected in a circuit with a resistor and a rectifier and a second capacitor having a resistance circuit connected thereacross connected in circuit with said rectifier, connections between said first capacitor, said resistor, said rectifier and said member to charge said first capacitor at a predetermined rate as current is supplied through said member, connections between said second capacitor, said rectifier and said member to charge said second capacitor as current is supplied through said member, said resistance circuit causing the charge on said second capacitor to discharge so that said charge is substantially the same magnitude at the same relative instant in each period of the alternating voltage during the supply of current through said member, said control connections being effective in response to the difference in the charges on the first and second capacitors to cause said valve means to be conductive following operation of the starting device until the charge on the first capacitor reaches a predetermined magnitude.

9. A control system for use in supplying current through an impedance member from an alternating voltage source, comprising a pair of inversely connected electric valves of the arc-like type in circuit across said source, the first of said valves having a control electrode and a cathode with the cathode being connected to one terminal of said member, a starting device, first control connections actuable by said starting device to cause said first valve to be rendered conductive in each half-period of the alternating voltage of one polarity following operation of said starting device, second control connections for causing the second valve to be rendered conductive in each half-period of the opposite polarity immediately following a half-period in which said first valve is conductive, said first control means including a rectifier, a first capacitor and a second capacitor, connections connecting said rectifier and first capacitor in a shunt circuit across said member with the rectifier more remote from, and adapted to conduct current toward, said one terminal, and connections connecting said second capacitor in series with a resistor between said control electrode and a point on said shunt circuit intermediate said rectifier and first capacitor, whereby said first and second capacitors are charged simultaneously by current through said rectifier each time the second valve is conductive with the charge on said second capacitor increasing at a predetermined rate, the first control means further including a discharge resistance circuit across said first capacitor to cause the charge thereon to attain approximately the same maximum magnitude each time the second valve is conductive, said first control connections being effective in response to the difference between the charges on said first and second capacitors to cause said first valve to be rendered conductive in each half-period of said one polarity following operation of said starting device until the charge on said second capacitor reaches a predetermined magnitude greater than said maximum magnitude.

10. A control system for use in supplying current through a load from an alternating voltage source, comprising main electric valve means adapted to be connected in circuit with said source and load to control the current through the load, first control connections for said main valve means tending to cause said main valve means to be conductive in each half-period of the alternating voltage and including biasing connections normally effective to counteract the tendency of said control connections to cause said valve means to be conductive, an impedance member connected in a circuit adapted to be energized from said source, auxiliary valve means in said circuit for controlling current through said impedance member, a starting device, second control connections actuable by said device to cause said auxiliary valve means to be conductive following operation of said starting device, additional connections between said biasing connections and said member responsive to the voltage developed across said member upon a supply of current therethrough to render said biasing connections ineffective, and additional connections between said second control connections and said impedance member operable by the voltage developed across said impedance member by current therethrough to cause said auxiliary valve means to be non-conductive a predetermined time after operation of said starting device.

11. A control system for use in supplying current through a load from an alternating voltage source, comprising main electric valve means adapted to be connected in circuit with said source and load to control the current through the load, first control connections for said main valve means including potential supply means tending to cause said main valve means to be conductive in each half-period of the alternating voltage and biasing means normally effective to prevent said last-named means from causing said main valve means to be conductive, an impedance member connected in a circuit adapted to be energized from said source, auxiliary valve means in said circuit for controlling current through said impedance member, a starting device, and second control connections actuable by said device to cause said auxiliary valve means to be conductive following operation of said starting device, connections between said member and said biasing means responsive to the voltage developed across said impedance member upon a supply of current therethrough to render said biasing means ineffective, said second control means including a capacitor, and connections between said capacitor and said member to charge said member at a preselected rate by the voltage developed across said member upon current flow therethrough, said second control means being effective in response to a predetermined charge on said capacitor to cause said auxiliary valve means to be non-conductive.

12. A control system for use in supplying current through a load from an alternating voltage source, comprising main electric valve means adapted to be connected in circuit with said source and load to control the current through the load, first control connections for said main valve means including potential supply means tending to cause said main valve means to be conductive in each half-period of the alternating voltage and biasing means normally effective to prevent said last-named means from causing said main valve means to be conductive, an impedance member connected in a circuit adapted to be energized from said source, auxiliary valve means in said circuit for controlling current through said impedance member, a starting device, second control connections actuable by said device to cause said auxiliary valve means to be conductive following operation of said starting device, connections between said member and said biasing means responsive to the voltage developed across said impedance member upon a supply of current therethrough to cause said biasing means to become ineffective, said second control connections including a first capacitor and a second capacitor, connections between said first capacitor and said member to charge said member at a preselected rate by the voltage developed across said member as current is supplied therethrough, whereby an increasing charge is collected on said first capacitor, and connections between said member and said second capacitor to charge said second capacitor by the voltage developed across said member by current therethrough, said second capacitor having a resistance circuit connected thereacross to cause the charge thereon to be of substantially the same magnitude at the same relative instant in each period of the alternating voltage during the supply of current through said member, said first control connections being effective in response to the difference in the charges on said first and second capacitors to cause said auxiliary valve means to be conductive following operation of the starting device until the charge on the first capacitor reaches a predetermined magnitude.

EDWARD C. HARTWIG.

REFERENCES CITED

The following references are of record in the file of this patent:

UNITED STATES PATENTS

| Number | Name | Date |
| --- | --- | --- |
| 2,189,601 | Dawson | Feb. 6, 1940 |
| 2,232,541 | Levoy, Jr. | Feb. 18, 1941 |
| 2,246,906 | Viebahn et al. | June 24, 1941 |
| 2,263,773 | Gulliksen | Nov. 25, 1941 |
| 2,269,967 | Whiteley et al. | Jan. 13, 1942 |
| 2,283,647 | Palmer | May 19, 1942 |
| 2,372,068 | Faulk | Mar. 20, 1945 |
| 2,406,429 | Mahoney | Aug. 27, 1946 |
| 2,421,994 | Cooper | June 10, 1947 |